United States Patent [19]
Lehmann et al.

[11] Patent Number: 5,262,060
[45] Date of Patent: Nov. 16, 1993

[54] WET OXIDATION OF AMMONIUM SALT CONTAINING LIQUORS

[75] Inventors: Richard W. Lehmann; Bruce L. Brandenburg, both of Rib Mountain, Wis.

[73] Assignee: Zimpro Passavant Environmental Systems, Inc., Rothschild, Wis.

[21] Appl. No.: 845,567

[22] Filed: Mar. 4, 1992

[51] Int. Cl.$^5$ .............................................. C02F 1/74
[52] U.S. Cl. ...................................... 210/696; 210/761
[58] Field of Search ................... 210/696, 761, 762

[56] References Cited

U.S. PATENT DOCUMENTS

| | | | |
|---|---|---|---|
| 3,852,192 | 12/1974 | Fassell et al. | 210/63 |
| 4,013,560 | 3/1977 | Pradt | 210/761 |
| 4,174,280 | 11/1979 | Pradt et al. | 210/60 |
| 4,369,115 | 1/1983 | Bauer | 210/761 |
| 4,395,339 | 7/1983 | Chowdhury et al. | 210/761 |
| 4,461,743 | 7/1984 | Chowdhury et al. | 422/129 |
| 4,744,909 | 5/1988 | Ferraro et al. | 210/747 |
| 4,812,243 | 3/1989 | Brandenburg et al. | 210/761 |

Primary Examiner—Ivars Cintins
Attorney, Agent, or Firm—Tipton L. Randall

[57] ABSTRACT

This is a process for wet oxidation of an ammonium salt containing waste liquor which prevents plugging of the vapor-carrying lines of the wet oxidation system. The vapor-carrying lines are maintained in an unobstructed condition by adding sufficient liquid water to dissolve condensed ammonium salt which can plug these lines. This provides for safe operation of the wet oxidation system.

18 Claims, 2 Drawing Sheets

WET OXIDATION OF AMMONIUM SALT CONTAINING LIQUORS

FIELD OF THE INVENTION

The invention relates to a process for wet oxidation of an ammonium salt containing waste liquor with an oxygen containing gas. The process prevents plugging of the vapor-carrying lines of the wet oxidation system.

DESCRIPTION OF RELATED ART

A number of system configurations are available for continuous wet oxidation of liquid wastes at elevated temperature and pressure by an oxygen containing gas. These include a vertical bubble column reactor system (Zimpro), a horizontal stirred tank compartmented reactor (Wetox) and a multiple concentric pipe system (Vertech). Some form of counter current heat exchange between raw influent and oxidized effluent is included in each configuration for energy conservation. There are various methods of introducing liquid waste and oxygen containing gas into each system, as well as for removing treated effluent and oxygen depleted gas from the system.

The multiple concentric pipe system (Vertech), often situated in a deep well casing, is limited in that it usually requires liquid waste and oxygen containing gas mixing at surface level and, after the materials traverse the system, phase separation of the treated mixture also at surface level. Ferraro et al. disclose in U.S. Pat. No. 4,744,909 the injection of oxygen gas at a number of points down the well casing. This, however, requires extensive additional lengths of piping for such a system.

The other two configurations, vertical bubble column reactor (Zimpro) and horizontal stirred tank compartmented reactor (Wetox), offer greater flexibility in introducing both liquids and gases to the systems, as well as removing liquids and gases from those systems. Pradt et al. in U.S. Pat. No. 4,174,280 disclose employing an oxygen carrying water stream and injecting liquid waste or slurried waste directly into the vertical bubble column reactor. Chowdhury et al. in U.S. Pat. No. 4,461,743 describe an oxygen injection nozzle used to deliver oxygen gas directly into a wet oxidation reactor. Further, Chowdhury et al. in U.S. Pat. No. 4,395,339 disclose a method of operation for a wet oxidation system using pure oxygen.

Fassell et al. in U.S. Pat. No. 3,852,192 describe the horizontal stirred tank compartmented reactor where oxygen containing gas is supplied directly to the horizontal reactor and separate lines are employed to remove gases and liquids from the last chamber of the reactor.

After passage of liquid and gases through a wet oxidation reactor, which provides the reaction time for the oxidation to occur, the oxidized liquid effluent and oxygen depleted gases exit therefrom. With a single outlet from the reactor, both liquid and gaseous phases exit simultaneously. This mixture is then cooled against influent in a heat exchanger, then depressurized through a pressure control valve and finally the liquid and gases are separated in a separation vessel.

Brandenburg et al. in U.S. Pat. No. 4,812,243 describe treatment of caustic cyanide metal wastes where parallel effluent lines are used to remove liquid and gases from a vertical bubble column reactor. Dilute acid solution is forced through one of the exit conduits to remove scale while the other exit conduit is in use.

In either the vertical bubble column reactor or the horizontal stirred tank reactor, separate lines may be used to remove the liquid phase and the gaseous phase from the reactor. This is termed "hot separation" and is used where it is desirable to produce a separate concentrated liquid effluent stream and a gas stream before cooling and depressurization. Hot separation is employed with wet oxidation system temperatures of about 200° C. (234° F.) to about 373° C. (703° F.) and system pressures of about 300 psig (2068 KPa) to about 4500 psig (31,025 KPa). This hot separation configuration is shown in FIGS. 1 and 2 for the two reactor systems.

Operational problems are encountered in the hot separation configuration for carbonaceous COD and ammonium salt containing wastes when treated by wet oxidation in the reactors of FIGS. 1 or 2. Ammonium salt concentrations in excess of about 10 g/l in wastewater are most likely to cause problems. Vapor-carrying lines are subject to plugging, particularly where cooled, and when oxygen enriched air or essentially pure oxygen is used in the wet oxidation system. In fact, any vapor-contacting conduit which is not in contact with liquid waste is subject to this plugging problem. In this regard, we shall use the term vapor-carrying line to mean any conduit which transfers vapor phase or which is essentially in continuous contact with the vapor phase, such as the conduit from the vapor space of the reactor to a process control device or pressure relief valve.

Applicants have discovered a method of operating a wet oxidation system for ammonium salt containing wastes in the hot separation configuration which overcomes the vapor-carrying lines plugging problem.

SUMMARY OF THE INVENTION

The invention comprises a process for preventing plugging of vapor-carrying lines from a wet oxidation reactor while oxidizing a carbonaceous COD and ammonium salt containing waste liquor with an oxygen containing gas, thereby producing an oxidized liquid phase and a vapor phase containing ammonia and carbon dioxide. The vapor phase and liquid phase are removed from the reactor by separate exit conduit. Plugging is prevented by the step of adding sufficient liquid water to said vapor-carrying lines from said reactor to dissolve condensed ammonium salt, thereby maintaining said lines in an unobstructed condition. The process is applicable to systems where the condensed ammonium salt is ammonium carbonate, ammonium bicarbonate or a mixture of these salts. The liquid water may be added to the vapor-carrying lines continuously or intermittently as needed.

DESCRIPTION OF THE PREFERRED EMBODIMENTS

Figure 1:
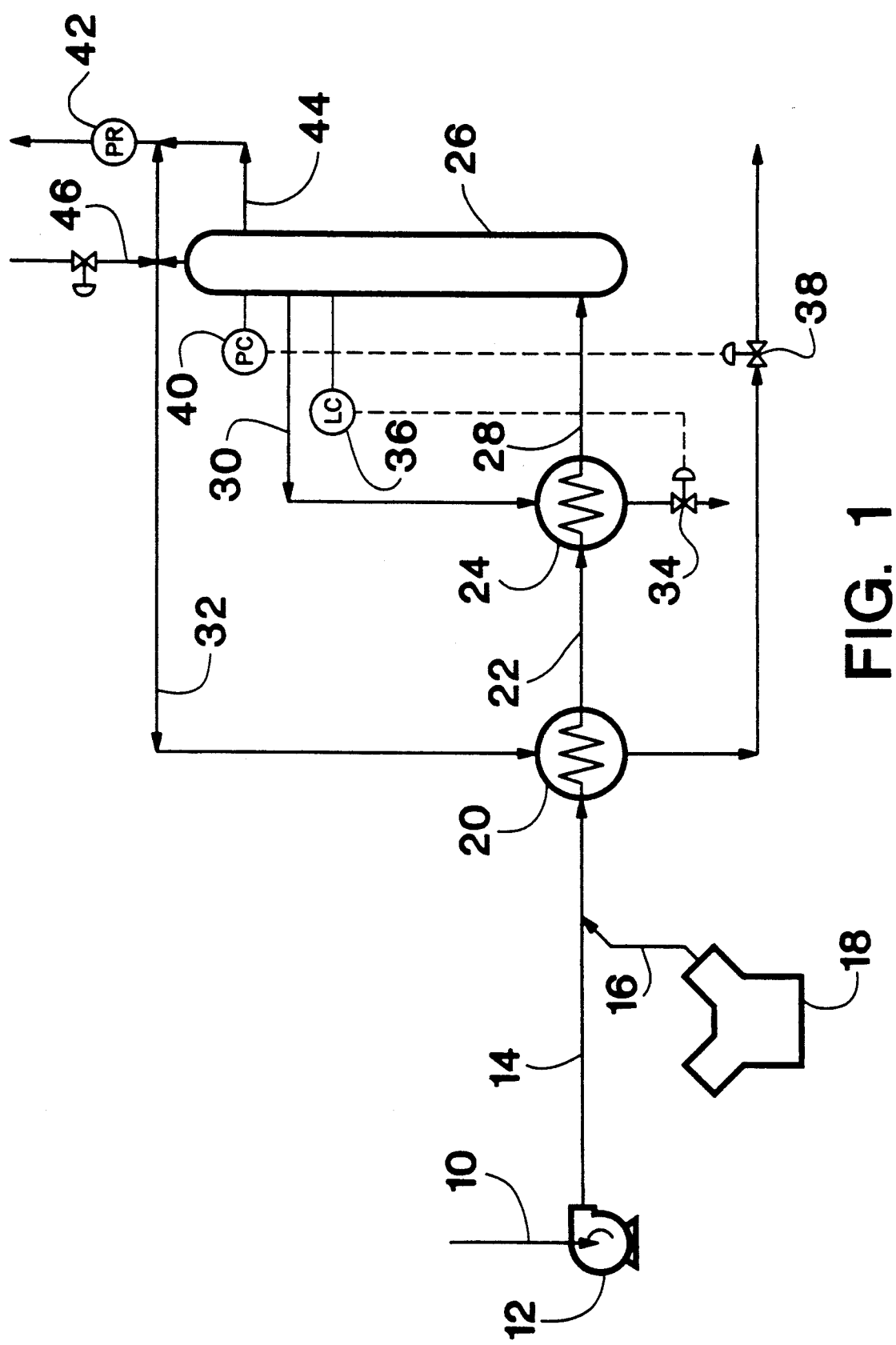
FIG. 1 is a flow diagram of a wet oxidation system operated with hot separation and employing the present invention.

Referring to FIG. 1, liquid waste is delivered by a conduit 10 to a high pressure pump 12 which pressurizes the waste in a feed conduit 14. The pressurized waste is therein mixed with an oxygen containing gas from a conduit 16 supplied from an oxygen source 18. The liquid/gas mixture then traverses a first heat exchanger 20, where it is heated against hot oxidation vapors. The heated liquid/gas mixture flows via a conduit 22 to a second heat exchanger 24, where the mixture is further heated by hot oxidized liquid. The hot liquid/gas feed mixture then enters the vertical bubble column reactor 26 via an inlet conduit 28. The reactor 26 provides the retention time for the system where the bulk of the wet oxidation reaction occurs. The upper portion of the reactor 26 contains two exit conduits. A first exit conduit 30 draws off oxidized liquid phase from the reactor while a second exit conduit 32 removes a gaseous phase from the reactor. The take off point for the oxidized liquid phase is below the gaseous phase take off point within the reactor 26. In this configuration a more concentrated oxidized liquid phase can be produced as opposed to cooling the whole reactor effluent and then separating liquid from gases.

The oxidized liquid phase in the first exit conduit 30 traverses the second heat exchanger 24 where it is cooled against the influent mixture, while the vapor phase in the second exit conduit 32 traverses the first heat exchanger 20 where it is also cooled against the influent mixture. Alternatively, separate heaters and coolers may be employed to heat the liquid/gas feed mixture and cool the oxidized liquid and gaseous phases. However, it is economically preferred to recover heat from the effluent streams by heat exchange with influent feed to the system. The cooled oxidized liquid phase then traverses a level control valve 34 operated by a level controller 36. The cooled oxidized vapor phase traverses a pressure control valve 38 operated by a pressure controller 40. The level controller 36 maintains the liquid level within the reactor 26 above the liquid phase take off point for the exit conduit 30 but below the gaseous phase take off point for the exit conduit 32. The level controller 36 and the pressure controller 40 operate independent of each other to maintain the desired liquid level in the reactor and the overall pressure within the wet oxidation system during the hot separation obtained in this system configuration. The depressurized oxidized vapor stream and liquid stream are then sent to individual liquid/vapor separator vessels for further processing.

Problems arise when the wet oxidation system of FIG. 1 is used to treat a carbonaceous COD containing waste which also contains significant concentrations of ammonium salts, particularly when using oxygen enriched air or essentially pure oxygen in the oxidation. Examples of such wastes include ammonium sulfate containing liquors from the production of acrylonitrile or caprolactam, or ammonium carbonate or ammonium bicarbonate containing wastewater. Applicants have encountered plugging of the vapor-carrying line 32 and the effluent side of the heat exchanger 20 by a crystalline material with the wet oxidation system operated in the hot separation mode. Likewise, any cooled accessory connection from the top of the reactor 26, such as a vapor sampling line or a pressure relief valve 42 and relief valve line 44 on the reactor, experienced the same plugging problem during operation. The offending material was found to be ammonium carbonate and/or ammonium bicarbonate. At the elevated temperatures and pressures of wet oxidation, apparently there is sufficient ammonia in the vapor phase to combine with oxidation generated carbon dioxide and form ammonium carbonate/bicarbonate solids. This occurred with wet oxidation of a carbonaceous COD and ammonium salt containing waste liquor at a neutral or slightly basic pH, ie. pH 7 or slightly above. The plugging problem was also observed where the oxidized liquid phase had a pH of about 1. Even this acidic liquid phase would not prevent at least some ammonia from entering the vapor phase. Thus the plugging problem is observed with oxidized liquid phase at about pH 1 to about pH 10.

Applicants have discovered that adding liquid water to the vapor-carrying line 32, the pressure relief valve line 44, or to any vapor sampling lines from the reactor, provides sufficient dissolution of the ammonium carbonate/bicarbonate solids material and maintains the line in operable condition. A water with low dissolved solids, such as potable water, is preferred for the dissolution water. This dissolution is particularly important in maintaining the unimpeded operation of the pressure relief valve 42 for the wet oxidation system. Plugging of the vapor-contacting pressure relief valve line 44 can lead to excessive pressure within the system which is dangerous and can even result in catastrophic failure of system components. The liquid water is supplied to the vapor-carrying lines of the system by a water feed conduit 46. A continuous small flow of liquid water, or a sufficiently frequent intermittent flow of liquid water, through these vapor-carrying lines provides for unimpeded operation of the system.

Figure 2:
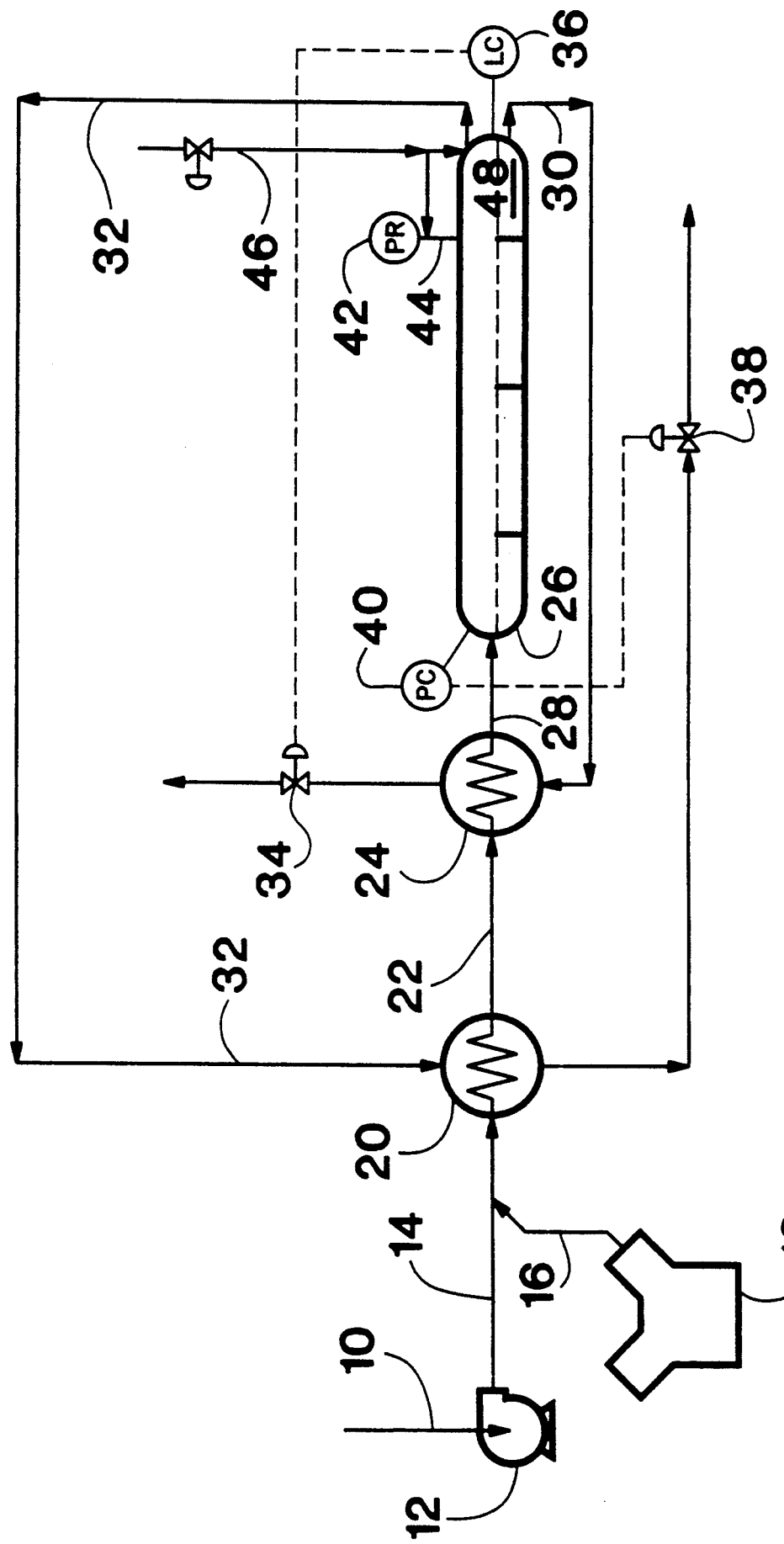
FIG. 2 is a flow diagram of another wet oxidation system operated with hot separation and employing the present invention.

FIG. 2 shows the same hot separation configuration used with a horizontal stirred tank compartmented reactor. Similar components in FIGS. 1 and 2 are denoted with the same indica. In FIG. 2 the reactor 26 has a first liquid exit conduit 30 for drawing off oxidized liquid phase from a last compartment 48 of the reactor, and a second exit conduit 32 for gaseous phase removal from the last compartment 48 of the reactor. Liquid water, supplied to the vapor-carrying line 32 and the pressure relief valve line 44 by the water supply line 46, dissolves any condensed ammonium carbonate/bicarbonate solids in these lines.

As mentioned earlier, the invention is applicable to any vapor-carrying line which is essentially in continuous contact with the vapor phase, but not in contact with the liquid phase. This situation occurs within any blind conduit from the reactor to a process control device or pressure relief valve. The plugging of these blind vapor-contacting conduit by ammonium salts has been observed in the wet oxidation of carbonaceous COD and ammonium salt containing liquor even where hot separation was not practiced. In that configuration both liquid phase and vapor phase exit the reactor through a single exit conduit. The blind vapor-contacting conduit encounters only the vapor phase containing ammonia and carbon dioxide and experiences plugging by a mixture of ammonium carbonate and bicarbonate, resulting in malfunction of the pressure control device. The addition of a small flow of liquid water at the end of the blind conduit farthest from the reactor dissolves the offending ammonium salt, maintains the passage in an operable condition and allows unhindered operation of the process control device. The operating conditions for the wet oxidation system without hot separation are as described above for the system with hot separation. The same type of ammonium salt waste liquor, ammonium salt concentration, oxidized liquor pH range, and content of oxygen containing gas apply to the system without hot separation.

From the foregoing description, one skilled in the art can easily ascertain the essential characteristics of the invention and, without departing from the spirit and scope thereof, make various changes and modifications to adapt it to various usages.

We claim:

1. A process for preventing plugging of vapor-carrying lines from a wet oxidation reactor by condensed ammonium carbonate and/or biacarbonate produced in a wet oxidation process comprising the steps;
   (a) oxidizing a carbonaceous COD and ammonium salt containing waste liquor with an oxygen containing gas in a reactor, thereby producing an oxidized liquid phase and a vapor phase containing ammonia and carbon dioxide;
   (b) removing said vapor phase and said liquid phase from said reactor by separate exit conduits; and
   (c) adding sufficient liquid water to said vapor-carrying lines from said reactor to dissolve condensed ammonium carbonate and/or bicarbonate thereby maintaining said vapor-carrying lines in an unobstructed condition.

2. A process according to claim 1 wherein said ammonium salt containing liquor is from the production of acrylonitrile.

3. A process according to claim 2 wherein said liquor contains ammonium sulfate.

4. A process according to claim 1 wherein said liquor contains ammonium carbonate and/or ammonium bicarbonate.

5. A process according to claim 1 wherein said waste liquor has an ammonium salt concentration in excess of about 10 g/l.

6. A process according to claim 1 wherein said oxidized liquid phase is between about 1 and about pH 10.

7. A process according to claim 1 wherein said oxygen containing gas is oxygen enriched air or essentially pure oxygen gas.

8. A process according to claim 1 wherein said adding of liquid water is continuous.

9. A process according to claim 1 wherein said wet oxidation reactor operates at temperatures of about 200° C. to about 373° C. and pressures of about 300 psig to about 4500 psig.

10. A process for preventing plugging of vapor-contacting lines from a wet oxidation reactor by condensed ammonium carbonate and/or bicarbonate produced in a wet oxidation process comprising the steps;
    (a) oxidizing a carbonaceous COD and ammonium salt containing waste liquor with an oxygen containing gas in a reactor, thereby producing an oxidized liquid phase and a vapor phase containing ammonia and carbon dioxide;
    (b) removing said vapor phase and said liquid phase from said reactor by a single exit conduit; and
    (c) adding sufficient liquid water to said vapor-contacting lines from said reactor to dissolve condensed ammonium carbonate and/or bicarbonate thereby maintaining said vapor-contacting lines in an unobstructed condition.

11. A process according to claim 10 said ammonium salt containing liquor is from the production of acrylonitrile.

12. A process according to claim 11 wherein said liquor contains ammonium sulfate.

13. A process according to claim 10 wherein said liquor contains ammonium carbonate and/or ammonium bicarbonate.

14. A process according to claim 10 wherein said waste liquor has an ammonium salt concentration in excess of about 10 g/l.

15. A process according to claim 10 wherein said oxidized liquid phase is between about pH 1 and about pH 10.

16. A process according to claim 10 wherein said oxygen containing gas is oxygen enriched air or essentially pure oxygen gas.

17. A process according to claim 10 wherein said adding of liquid water is continuous.

18. A process according to claim 10 wherein said wet oxidation reactor operates at temperatures of about 200° C. to about 373° C. and pressures of about 300 psig to about 4500 psig.

* * * * *

UNITED STATES PATENT AND TRADEMARK OFFICE
CERTIFICATE OF CORRECTION

PATENT NO. : 5,262,060

DATED : November 16, 1993

INVENTOR(S) : Richard W. Lehmann et al.

It is certified that error appears in the above-identified patent and that said Letters Patent is hereby corrected as shown below:

In Claim 6, column 5, line 35 of the Patent, insert --pH-- after "about" first occurrence.

In Claim 11, column 6, line 19 of the Patent, insert --wherein-- after "10".

Signed and Sealed this

Twenty-second Day of February, 1994

Attest:

BRUCE LEHMAN

*Attesting Officer*      *Commissioner of Patents and Trademarks*